Dec. 27, 1932.                    J. P. MARCY                    1,891,995
                                   PIPE DOLLY
                              Filed Feb. 29, 1932
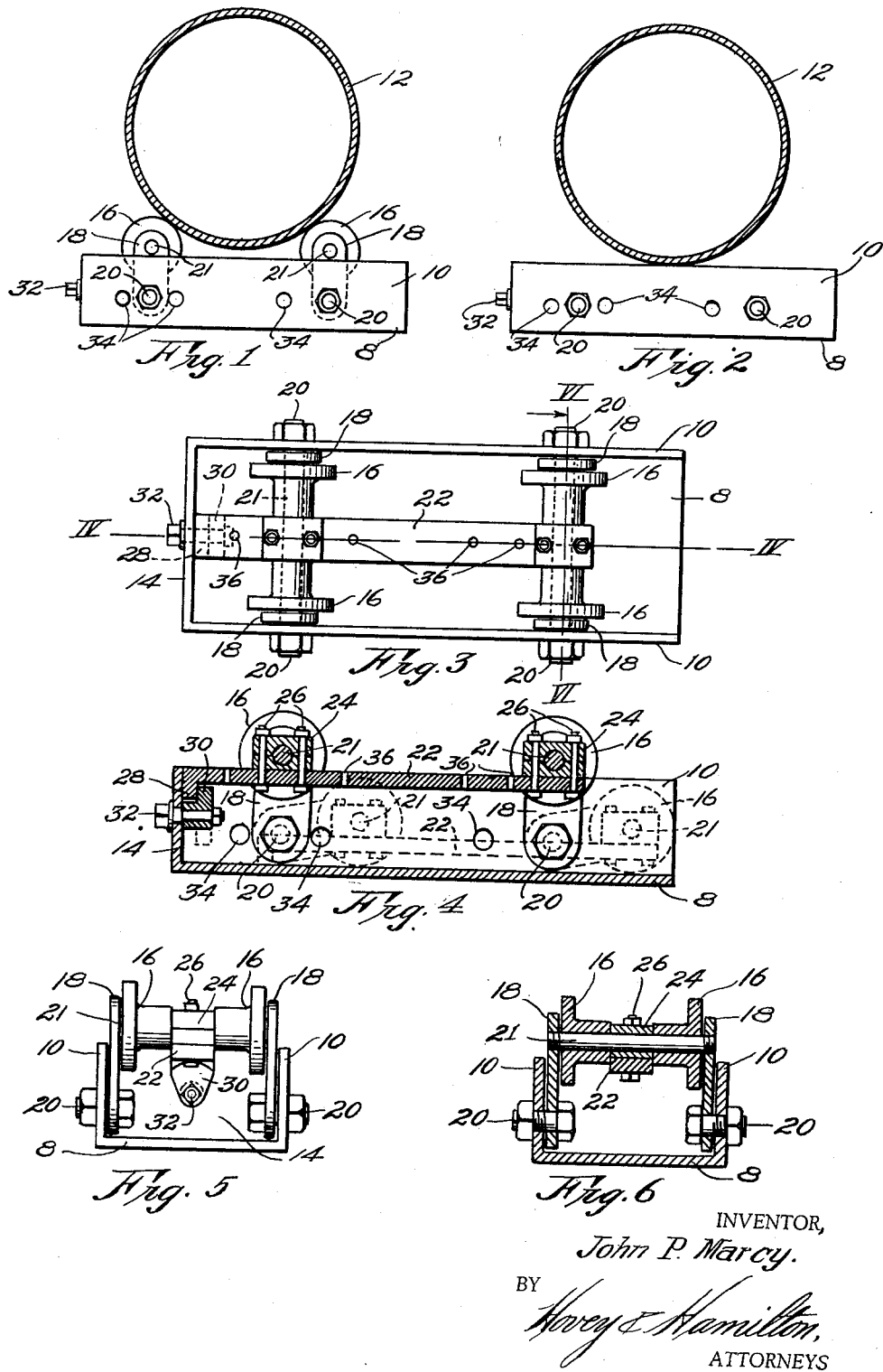
INVENTOR,
John P. Marcy.
BY
Hovey & Hamilton,
ATTORNEYS Patented Dec. 27, 1932

1,891,995

UNITED STATES PATENT OFFICE

JOHN P. MARCY, OF KANSAS CITY, MISSOURI

PIPE DOLLY

Application filed February 29, 1932. Serial No. 595,951.

This invention relates to pipe handling equipment and particularly means for rotatably supporting a length of pipe that is to be turned about its longitudinal axis while some work is being performed thereon and the primary object of this invention is to provide such a pipe dolly, wherein is provided structure for releasably so supporting the pipe.

A further object of the instant invention is the contemplation of a pipe dolly having structure for rotatably supporting a pipe, which structure is releasably latched in the operative position, whereby the same may be housed within a part of the pipe dolly, and as said releasing takes place, the supported pipe may be caused to rest upon rolling surfaces for the purpose of easily removing the pipe from its supported position on the dolly.

An even further object of the invention is to provide a strong, rugged pipe dolly having a series of rollers movably mounted for projection above a rolling surface formed by the dolly and for movement into a completely housed position, whereby the same become inoperative and move a supported pipe to a pair of opposed side rails for the purpose of removing the pipe from the dolly.

A still further object of this invention is the provision of a pipe dolly, wherein is incorporated a series of movable, pipe-supporting rollers, all traveling as a unit to and from a projected position where they may be secured to the supporting body of the dolly and where they effectively carry the pipe being worked upon.

Structural details involved in this invention are important, and minor objects covering such features will appear during the course of the following specification, referring to the accompanying drawing, wherein:

Figure 1 is a side elevation of a pipe dolly involving this invention, illustrating the same operatively supporting a pipe.

Fig. 2 is a similar side elevation of the pipe dolly showing the supporting rollers thereof withdrawn and the pipe resting upon the side rails.

Fig. 3 is a top plan view of the dolly as shown in Fig. 1 but with the pipe removed.

Fig. 4 is a vertical, longitudinal, central section through the pipe dolly taken on line IV—IV of Fig. 3.

Fig. 5 is an end elevation of the pipe dolly, and,

Fig. 6 is a vertical cross section through the dolly, taken on line VI—VI of Fig. 3.

But the preferred form of the invention is illustrated in the accompanying drawing, wherein like reference characters designate similar parts throughout the several views. It is understood that such modifications as might fairly fall within the scope of the invention may be constructed into the pipe dolly with the same effect and to perform the same function as the device herewith shown.

The dolly comprises a body 8, formed as shown to present a box-like structure, having side rails 10 upon which a pipe 12 may roll when the dolly is not operating to rotatably support the pipe 12. An end member 14 joins sides 10 and it is between the longitudinal, substantially parallel, and upstanding sides 10 that the movable structure of the dolly is housed when pipe 12 is being removed therefrom by rolling the same along the upper bearing faces of side rails 10.

This dolly is particularly advantageous when welding together sections of pipe 12 or performing any other work on pipe 12 which requires the same to be revolved about its longitudinal axis. Fig. 1 illustrates the dolly operably supporting pipe 12.

Pipe-engaging rollers 16 are arranged in pairs and each pair is supported by opposed links 18, each of which is in juxtaposition to each side 10 and pivotally carried thereby through the medium of bolt 20, which acts as a stub shaft. Bolt 20 passes through its related link 18 near one end thereof and the opposite ends of the opposed links 18 carry transverse shaft 21 which, in turn, rotatably carries rollers 16. In the instance shown, there are two sets of opposed rollers joined by connecting links 22 for the purpose of simultaneously moving all rollers to and from an operative position, and also to provide means for securing all rollers 16 in such position. Connection to shaft 21 is made by bearings 24, secured together and to link 22 by bolts 26, and one end of link 22 extends laterally to provide lug 28, which engages end 14 of body 8, to preclude movement of links 28 in one direction after they have been positioned as illustrated in Figs. 1 and 4. A dog 30 is movably carried by end 14 of body 8 for engagement with lug 28, whereby links 18 are held against movement in the opposite direction.

Dog 30 is mounted upon a squared stub shaft 32 that is shouldered and projects through end 14 where it may be engaged by any suitable instrument or handle for the purpose of moving dog 30 to and from the locking position. Dog 30 is formed as shown in Fig. 5 and as soon as the same releases its hold upon lug 28, the weight of pipe 12 will cause all of the moving parts of the dolly to move toward the position illustrated in dotted lines of Fig. 4.

The relation of the parts of this device require that when rollers 16 are moved into a housed position between sides 10, no part of the rollers will project above the bearing face of sides 10 to engage pipe 12 as it is rolled therealong. In operation, rollers 16 are projected above sides 10 and pipe 12 positioned thereon. When work on the pipe is completed, dog 30 is moved out of the latching position from behind lug 28 and a relative position between sides 10 and pipe 12 is taken such as is shown in Fig. 2. Lifting of pipe 12 becomes unnecessary and it may be rolled from the dolly without difficulty.

It is possible to handle and work upon pipes of various diameters by simply adjusting the distance between rollers 16. This adjustment may be effected by providing a plurality of opposed holes 34 through sides 10 of body 8. Bolts 20 are removed by merely disassociating the removable nuts therefrom and replacing after links 18 have been moved to the desired location. To set up proper relation between the parts when adjustment takes place, it is necessary to provide a series of holes 36 through connecting link 32. These holes receive bolts 26 in a manner which is obvious.

The operation of this pipe dolly is apparent not only from the reading of the specification, but by an understanding of the accompanying drawing. It is obvious that complicated parts are eliminated and that it is not necessary to utilize lifting jacks, bars or any other tool to remove a heavy length of pipe from the dolly after work has been performed thereon.

Having thus described the invention, what is claimed as new and desired to be secured by Letters Patent is:

1. A pipe dolly comprising a body; a series of rollers mounted on said body for movement to and from a position projected from the body; and means to maintain said rollers in the projected position including a link interconnecting the series of rollers and releasably secured to said body.

2. A pipe dolly comprising a body; a series of rollers mounted on said body for movement to and from a position projected from the body; and means movable with said rollers to maintain them in the projected position including a link interconnecting said series of rollers, and a latch to interconnect said body and link when said series of rollers are in the projected position.

3. A pipe dolly comprising a recessed body; a series of rollers mounted on said body for movement into and out of said recess; and means including a link interconnecting said series of rollers and movable therewith to and from a completely housed position within the body recess.

4. A pipe dolly comprising a body having upstanding, parallel opposed sides; links pivotally carried between said sides; a roller supported at the end of each link; and means to preclude pivotal movement of the links when said rollers are projected beyond the said body sides by said links.

5. A pipe dolly comprising a body having upstanding opposed sides; links pivotally carried between said sides; a roller supported at the end of each link; a locking member to preclude pivotal movement of the links when said rollers are projected beyond said body sides; a plurality of opposed holes through said sides; and a plurality of holes through the locking member, all of said holes being relatively positioned whereby adjustment of said rollers is made.

6. A pipe dolly comprising a body having a pair of side rails; a pair of opposed links pivotally secured to said side rails; a shaft journalled in the free ends of each pair of opposed inks; a pair of rollers mounted on each shaft; a link interconnecting said shafts between the said rollers; and means for latching together said link and body when said rollers are projected beyond the said rails by the opposed links.

7. A pipe dolly comprising a body having a pair of side rails; a pair of opposed links pivotally secured to said side rails; a shaft journalled in the free ends of each pair of opposed links; a pair of rollers mounted on each shaft; a link interconnecting said shafts between the said rollers; and means for latching together said link and body when said rollers are projected beyond the said rails by the opposed links, said rollers supporting a pipe above the side rails when the link and body are latched together.

8. A pipe dolly comprising a body having a pair of side rails; a pair of opposed links pivotally secured to said side rails; a shaft journalled in the free ends of each pair of opposed links; a pair of rollers mounted on each shaft; a link interconnecting said shafts between the said rollers; and means for latching together said link and body when said rollers are projected beyond the said rails by the opposed links, said latching means including a downturned lug at the end of said connecting link and a dog rotatably carried by said body in the path of travel of said lug, said lug being interposed between the dog and a portion of the body when said dog is in the latched position.

In testimony whereof, I hereunto affix my signature.

JOHN P. MARCY.